United States Patent Office 3,629,455
Patented Dec. 21, 1971

3,629,455
METHOD OF TREATING HELMINTHIASIS AND
IMIDOYLUREA COMPOSITIONS THEREFOR
Guy D. Diana, Stephentown, N.Y., assignor to
Sterling Drug Inc., New York, N.Y.
No Drawing. Filed Mar. 7, 1968, Ser. No. 711,235
Int. Cl. A61k 27/00
U.S. Cl. 424—322                               6 Claims

ABSTRACT OF THE DISCLOSURE

Hookworms and tapeworms are eliminated from warm blooded animals by the use of 1-phenyl-3-alkanimidoylureas.

---

This invention relates to novel imidoylureas, to their preparation, to compositions formulated from said novel imidoylureas, and to methods for use of said imidoylureas and compositions to combat helminth infestations in animals.

In one aspect of this invention, there is provided novel 1-phenyl-3-alkanimidoylureas having the formula

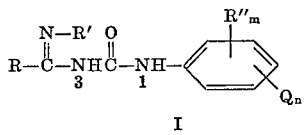

I where R is alkyl; R' is hydrogen or lower-alkyl; Q is from one to $n$ substituents of the group consisting of lower-alkoxy, phenyl-lower-alkoxy, lower-alkanoyloxy, hydroxy, di(lower-alkyl)amino, lower-alkanoylamino, amino, lower-alkylsulfonyl, lower-alkylsulfinyl, lower-alkylthio, trihalomethyl, nitro and halo; R" is lower-alkyl; $n$ is an integer from 1 to 5; and $m$ is an integer from 0 to (5–n).

Another aspect of this invention is the provision of novel 1-phenyl-3-alkanimidoylureas of the formula

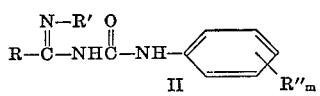

II where R is alkyl; R' is hydrogen or lower-alkyl; R" is lower-alkyl; and $m$ is an integer from 0 to 5.

The compounds of Formula I and Formula II are prepared by the following methods:

By reacting, in a suitable solvent, that is, a solvent which is essentially inert under the conditions of the reaction, an amidine of the formula

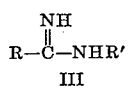

III with an isocyanate of the formula $$R'''-N=C=O$$

IV where R and R' have the meaning hereinbefore defined for R and R' of Formula I and Formula II; and R''' is

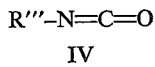

where Q is from one to $n$ substituents of the group consisting of lower-alkoxy, phenyl-lower-alkoxy, lower-alkanoyloxy, di(lower-alkyl)amino, lower-alkanoylamino, lower-alkylsulfonyl, lower-alkylsulfinyl, lower-alkylthio, trihalomethyl, nitro and halo; and R", $m$ and $n$ have the meaning hereinbefore defined for R", $m$ and $n$ of Formula I; or R''' is

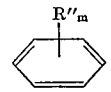

where R" and $m$ have the meaning hereinbefore defined for R" and $m$ of Formula II.

The reaction is preferably carried out by reacting an amidine of Formula III with an equivalent amount of an isocyanate of Formula IV in a non-hydroxylic solvent, for example, acetone or benzene, at temperatures ranging from about 5° C. to about 15° C., for about one-half hour, and then allowing the temperature of the reaction mixture to rise to room temperature. The reaction is usually complete after about one hour.

The exothermic reaction can be carried out at temperatures ranging from about 0° C. to about 80° C. However, the resulting desired compounds of Formula I or Formula II, where R' is hydrogen, can react further with the unreacted isocyanate, represented by Formula IV, especially at elevated temperatures, to form undesired side products. In order to avoid or minimize such further reaction, the reaction is preferably carried out initially at temperatures below room temperature using approximately equimolar amounts of the appropriate amidine and isocyanate.

The compound of Formula I where Q includes one or more amino and/or hydroxy substituents are prepared, by well known catalytic hydrogenation procedures, from the corresponding compounds where Q includes one or more nitro and/or benzyloxy substituents respectively, whereby said substituents are converted to amino and/or hydroxy substituents.

The catalytic hydrogenation is carried out at room temperature in an inert solvent, e.g. ethyl alcohol, under essentially neutral conditions in the presence of a suitable catalyst, e.g. Raney nickel or palladium on charcoal, and at about atmospheric pressure and the hydrogenation is stopped after a stoichiometric amount of hydrogen has reacted.

It will be understood that the substituents represented by Q and R" as defined hereinabove can be attached to the phenyl ring at any of the available positions and where there are a plurality of substituents Q and/or R", these substituents Q and/or R" respectively can be the same or different and can occur in any of the position combinations relative to each other.

The amidine in its free base form employed as starting material in the above described process is prepared from its corresponding salt, e.g. the hydrochloride by reacting this salt with a stoichiometric amount of an appropriate base in a suitable solvent, for example, sodium acetonide in acetone, triethylamine in chloroform, or sodium methoxide in benzene. It is preferred to use the resulting solution of the amidine directly in the next step but the amidine can be isolated by conventional techniques before use.

Amidine salts belong to a generally known class of compounds and can be readily prepared from nitriles by methods well known in the art of chemistry. Thus, a desired amidine can be obtained by conversion of the corresponding nitrile of the formula

V to the salt of the corresponding imino-ether followed by treatment with an amine of the formula

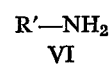

VI where R and R' have the meaning hereinbefore defined for R and R' of Formula I and Formula II.

The following general procedure illustrates the method that can be used for the preparation of the salt of the amidine of Formula III:

Dry hydrogen chloride gas is passed through an ice-bath cooled solution of 2 moles of the intermediate nitrile in 100 ml. absolute ether and 2.1 moles of dry methyl alcohol until 2.6 moles is absorbed and the resulting solution is allowed to stand at about 5° C. for about three days. The resulting solid imino-methylether hydrochloride is ground to a paste under absolute ethyl alcohol and added to a solution of 2.2 moles of the intermediate amine in 400 ml. absolute ethyl alcohol and the solution is stirred at room temperature for three hours and then kept at about 5° C. for about sixteen hours during which time the amidine hydrochloride generally precipitates in crystalline form and can be isolated by filtration and used without further purification in the next step. Alternatively the amidine hydrochloride can be recrystallized from a suitable solvent before use.

The isocyanate of Formula IV employed as starting material in the hereinbefore described process belongs to a well known class of compounds and can be readily prepared by conventional methods, for example, by condensing an amine of the formula $$R'''—NH_2$$

VII where R''' has the meaning hereinbefore defined for R''' of Formula IV with one equivalent of phosgene in a suitable solvent, for example toluene, and heating or distilling the resulting carbamyl chloride whereupon hydrogen chloride is eliminated. The resulting corresponding isocyanate can be isolated and purified by standard techniques.

Other well known procedures that can be used for the preparation of the isocyanate of Formula IV are the Hoffman, Curtius, or Lossen rearrangements of a carboxylic acid of the formula

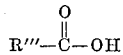

VIII where R''' has the meaning hereinbefore defined for R''' of Formula IV.

The carbimidoylureas of my invention exist in tautomeric forms as illustrated by the formulas

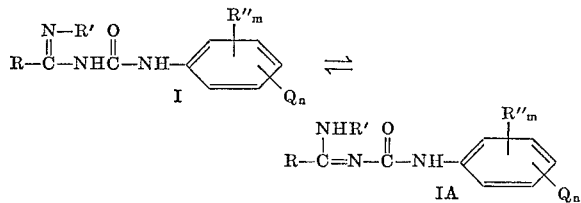

and

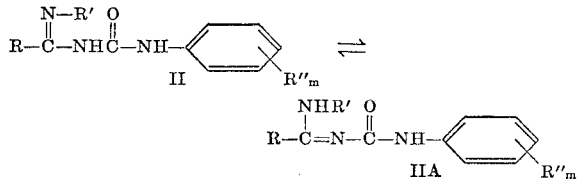

As with all tautomeric systems, the rate of transformation I⇌IA and the ratio *I/IA* and the rate of transformation II⇌IIA and the ratio *II/IIA* are dependent on the thermodynamic environment, including the state of aggregation, so that measurements by any particular technique do not necessarily have validity except under the conditions of the measurement, thereby, among other consequences, giving rise to problems for any simple designation of the physical embodiments. Thus, measurement of the infrared spectra in potassium bromide admixture and measurement of the nuclear magnetic spectra are not helpful in determining which tautomeric form, I or IA, or which tautomeric form II or IIA is present or predominates and therefore the names based on structure I and structure II are preferred although it is understood that either or both structures I and IA and either or both structures II and IIA are comprehended.

Throughout this specification it will be understood that the term "alkyl" means a group preferably having from one to fourteen carbon atoms which can be arranged in a straight or branched chain as illustrated, without limiting the generality of the foregoing, by methyl, ethyl, propyl, isopropyl, butyl, isobutyl, heptyl, nonyl, decyl or tetradecyl.

Here and elsewhere throughout this specification it will be understood that the terms "lower-alkyl," "lower-alkoxy" and "lower-alkanoyl" each mean a group preferably containing from one to six carbon atoms which can be arranged in a straight or branched chain as illustrated, without limiting the generality of the foregoing, by methyl, ethyl, propyl, isopropyl, butyl, sec-butyl, pentyl, or hexyl for lower-alkyl, methoxy, ethoxy, isopropoxy, or hexyloxy for lower-alkoxy, and acetyl, propionyl, trimethylacetyl, and caproyl for lower-alkanoyl.

As used throughout this specification the term "halo" includes chloro, bromo, fluoro and iodo.

The novel carbimidoylureas of the instant invention can exist in either base or acid-addition salt form. The compounds of Formulas I and II and IX, vide infra), in free base form, are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates, and alkali metal bicarbonates. The bases thus regenerated can then be interacted with the same or a different acid to give back the same or a different acid-addition salt. Thus the novel bases and all of their acid-addition salts are readily interconvertible, and are the full equivalents of each other.

It will thus be appreciated that Formulas I, II and IX not only represent the structural configuration of the bases of Formulas I, II and IX but are also representative of the structural entity which is common to all of my compounds of Formulas I, II and IX whether in the form of the free bases or in the form of the acid-addition salts of the bases. I have found that by virtue of this common structural entity, the bases and their acid-addition salts have inherent pharmacodynamic activity of a type more fully described herein. This inherent pharmacodynamic activity can be enjoyed in useful form for pharmaceutical purposes by employing the free bases themselves or the acid-addition salts formed from pharmaceutically acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the compounds of Formulas I, II and IX, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new 1-phenyl-3-alkanimidoylureas and not in any particular acid moiety or acid anion associated with the salt froms of my compounds; rather, the acid moieties or anions which can be associated in the salt froms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and polycarboxylic acids, such as found, for example, in Beilstein's Organische Chemie, 4th ed., volumes III, IV, IX, X, XIV, XVII, XIX, XXI, XXII, and XXV; organic mono- and polysulfonic and -sulfinic acids, such as found, for example, in Beilstein volumes VI, XI, XVI, and XXII; organic phosphonic and phosphinic acids, such as found, for example, in Beilstein volumes I and XVI; organic acids of arsenic and antimony, such as found, for example, in Beilstein volume XVI; organic heterocyclic carboxylic, sulfonic, and sulfinic acids, such as found, for example, in Beilstein volumes XVIII, XXII, and XXV; acidic ion-exchange resins; and inorganic acids of any acid forming element or combination of elements, such as found in Mellor, Comprehensive Treatise on Inorganic and Theoretical Chemistry, Longmans Green and Co., New York, N.Y. volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds, such as found, for example, in volume VI of Beilstein, acidic compounds having "activated" or acidic hydrogen atoms, as for example, picrolonic acid, or barbituric acid derivatives having an acidic proton, such as found, for example, in Cox et al. Medicinal Chemistry, vol. IV, John Wiley and Sons, Inc., New York N.Y. (1959). Also comprehended as salt forming agents are so-called Lewis acids which lack a pair of electrons in the outer "electron shell" and react with basic compounds having an unshared pair of electrons to form salts, for example boron trifluoride.

Representative acids for the formation of the acid-addition salts include formic acid, acetic acid, trifluoroacetic acid, isobutyric acid, alpha-mercaptopropionic acid, malic acid, fumaric acid, oxalic acid, succinic acid, succinamic acid, glutamic acid, tartaric acid, citric acid, pamoic acid, lactic acid, glycolic acid, gluconic acid, saccharic acid, ascorbic acid, penicillin, benzoic acid, 4-methoxybenzoic acid, phthalic acid, salicylic acid, acetylsalicylic acid, anthranilic acid, 1-naphthalenecarboxylic acid, cinnamic acid, cyclohexene-carboxylic acid, mandelic acid, tropic acid, crotonic acid, acetylene dicarboxylic acid, sorbic acid, pyromucic acid, cholic acid, pyrenecarboxylic acid, 2-pyridinecarboxylic acid, 3-indoleacetic acid, quinic acid, sulfamic acid, methanesulfonic acid, ethanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methanephosphonic acid, phenylphosphinic acid, acidic resins, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The compounds of this invention have been tested in dogs by standard chemotherapeutic evaluation procedures described hereinbelow and were found to posses anthelmintic activity, in particular anti-hookworm activity. They are therefore useful as anthelmintic agents, in particular as anti-hookworm agents.

TEST PROCEDURE FOR THE DETERMINATION OF ANTHELMINTIC ACTIVITY

Anti-hookworm Activity: Both naturally infected and artificially infected mongrel dogs were used in the test. The naturally infected dogs carried a burden of two kinds of hookworm (*Uncinaria stenocephala* and *Ancylostoma caninum*). The artifically infected dogs were treated with sufficient hookworm (*Ancylostoma caninum*) larvae approximately one month prior to treatment with a test agent to insure that a mature infection would be present at the time of the test. Food was withheld from the dogs for a minimum of five hours prior to, and for three to five hours after each, administration of the test agent. Equal doses of the test agent were administered orally to from two to three dogs, infected naturally or artificially, one to two doses per dog per day for from one to five consecutive days. The dogs were sacrificed five to eight days post-first medication and the intestines were searched for worms.

The above described test procedure can also be used in the determination of anthelmintic activity where the host is infected by other intestinal vermiform parasites, for example tapeworm.

The carbimidoylureas of this invention were found to reduce or eliminate the helminth burden from hookworm infested dogs when administered in the dose range of from 10 to 125 mg./kg. (calculated on the basis of the free base). The number of doses administered ranged from one to two per day for from one to five consecutive days, depending on the severity of the helminth infestation.

The actual determination of the numerical biological data definitive for a particular compound is readily determined by standard test procedures by technicians versed in pharmacological test procedures, without the need for any extensive experimentation.

Another aspect of this invention is the method of eliminating the helminth burden from mammals infested by helminths which comprises administering to the host an amount toxic to said helminths of a compound of the formula

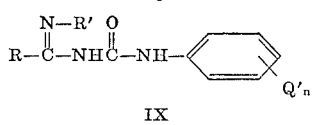

IX where R is alkyl; R' is hydrogen or lower-alkyl; Q' is from none to $n$ substituents of the group consisting of lower-alkyl, lower-alkoxy, phenyl-lower-alkoxy, lower-alkanoyloxy, hydroxy, di(lower-alkyl)amino, lower-alkanoylamino, amino, lower-alkylsulfonyl, lower-alkylsulfinyl, lower-alkylthio, trihalomethyl, nitro and halo; and $n$ is an integer from 0 to 5, in conjunction with an integer from 0 to 5, in conjunction with an enterally acceptable pharmaceutical excipient.

It will be understood that the substituents represented by Q' as defined hereinabove can be attached to the phenyl ring at any of the available positions and where there are a plurality of substituents, such substituents can be the same or different and can occur in any of the position combinations relative to each other.

Another aspect of this invention provides a composition, adapted to eliminating the helminth burden from mammals infested by said helminths, which composition comprises as the essential active ingredient a compound of Formula IX defined above.

Another aspect of this invention provides a composition, defined hereinabove, in unit dosage form, for instance as tablets or capsules for oral administration either alone or in combination with suitable adjuvants such as calcium carbonate, starch, lactose, talc, magnesium stearate, gum acacia, and the like.

Still further the compositions can be formulated for oral administration in aqueous alcohol, glycol, or oil solutions or oil-water emulsions in the same manner as conventional medicinal substances are prepared; compositions for oral use also encompass formulations with foodstuffs or for admixture with foodstuffs for veterinary use.

The compound of Formula IX and the compositions defined hereinabove are preferably administered orally and the amount of such compound to be administered, either by itself or as the essentially active ingredient in said compositions will range from about 10 to about 125 mg. (calculated on the basis of the free base) per kilogram of body weight of the helminth infested animal and the number of doses to be administered will range from one to two per day for from one to five consecutive days, depending on the severity of the helminth infestation.

The molecular structures of the compounds of this invention were assigned on the basis of the method of their synthesis and study of their infrared spectra, and confirmed by the correspondence between calculated and found values for the elementary analysis for representative examples.

The following examples will further illustrate the invention without, however, limiting it thereto:

EXAMPLE 1

1-(4-chlorophenyl)-3-(pentanimidoyl)urea

To a stirred mixture, prepared by reacting 4.6 g. sodium with 300 ml. dry acetone at room temperature, was added 27.2 g. valeramidine hydrochloride in one portion and stirring was continued for twenty minutes. To the resulting mixture was added dropwise, during one and one-half hours, a solution of 30.7 g. 4-chlorophenyl isocyanate in 100 ml. dry acetone with stirring and external cooling in order to prevent the exothermic reaction from heating the mixture above room temperature. Stirring was continued at room temperature for eighteen hours and the mixture was concentrated to dryness under reduced pressure. The residue was taken up in ether and the sodium chloride was removed by filtration. The filtrate was chilled and treated with ethereal hydrogen chloride until acidic and the resulting solid was collected by filtration, washed with ether, and recrystallized from ethyl alcohol to give 34.6 g. of the hydrochloride of 1-(4-chlorophenyl)-3-(pentanimidoyl)urea; M.P. 202–204° C.

A suspension of 10 g. of the hydrochloride in 100 ml. dry ether was treated with 3 ml. of isopropylamine with stirring. The mixture was allowed to stand for one hour at room temperature, the solids were removed by filtration, and the filtrate was evaporated to dryness under reduced pressure. The residue was crystallized from benzene-hexane to yield 1-(4-chlorophenyl)-3-(pentanimidoyl)urea; M.P. 82–84° C.

Treatment of a benzene solution of the free base with a stoichiometric amount of lactic acid, evaporation to dryness under reduced pressure, and trituration with ether yielded the lactate of 1-(4-chlorophenyl)-3-(pentanimidoyl)urea; M.P. 100–103° C.

Treatment of an isopropyl alcohol solution of the free base with an aqueous solution of a stoichiometric amount of sulfamic acid, evaporation to dryness under reduced pressure, and recrystallization from isopropyl alcohol yielded the sulfamate of 1-(4-chlorophenyl)-3-(pentanimidoyl)urea; M.P. 143.5–145° C.

Following a procedure similar to that described in Example 1 but substituting for valeramidine hydrochloride an equivalent amount of the hydrochlorides of the following:

(a) acetamidine
(b) isobutyramidine
(c) 3,7-dimethyloctanamidine
(d) tridecanamidine
(e) pentadecanamidine there can be obtained respectively the hydrochlorides of the following:

(a) 1-(4-chlorophenyl)-3-(acetimidoyl)urea
(b) 1-(4-chlorophenyl)-3-(isobutyrimidoyl)urea
(c) 1-(4-chlorophenyl) - 3 - (3,7-dimethyloctanimidoyl) urea
(d) 1-(4-chlorophenyl)-3-(tridecanimidoyl)urea
(e) 1-(4-chlorophenyl)-3-(pentadecanimidoyl)urea.

EXAMPLE 2

1-(4-methoxyphenyl)-3-(pentanimidoyl)urea

Following a procedure similar to that described in Example 1 but using 3.39 g. sodium in 200 ml. dry acetone, 20 g. valeramidine hydrochloride and 21.9 g. 4-methoxyphenyl isocyanate in 100 ml. dry acetone, there was obtained after recrystallization from ethyl alcohol 15.5 g. of the hydrochloride of 1-(4-methoxyphenyl)-3-(pentanimidoyl)urea; M.P. 143.5–145° C.

EXAMPLE 3

1-(4-chlorophenyl)-3-(nonanimidoyl)urea

Following a procedure similar to that described in Example 1 but using 3.9 g. sodium in 300 ml. dry acetone, 28.9 g. nonanamidine hydrochloride, and 23 g. p-chlorophenyl isocyanate in 100 ml. dry acetone, there was obtained after recrystallization from acetonitrile 40.5 g. of the hydrochloride of 1-(4-chlorophenyl)-3-(nonanimidoyl)urea; M.P. 155–157° C.

The nonanamidine hydrochloride (M.P. 113° C.) used above was prepared following the general procedure described in Example 11-B but substituting for valeronitrile and methylamine an equivalent amount of nonanenitrile and ammonia respectively.

EXAMPLE 4

1-(4-chlorophenyl)-3-(octanimidoyl)urea

Following a procedure similar to that described in Example 1 but using 2.2 g. sodium in 200 ml. dry acetone, 17.8 g. octanamidine hydrochloride, and 15.3 g. 4-chlorophenyl isocyanate in 100 ml. benzene, there was obtained after recrystallization from acetonitrile 19.7 g.

of the hydrochloride of 1-(4-chlorophenyl)-3-(octanimidoyl)urea; M.P. 156–165° C.

EXAMPLE 5

1-(2-chlorophenyl)-3-(pentanimidoyl)urea

Following a procedure similar to that described in Example 1 but using 2.3 g. sodium in 250 ml. dry acetone, 13.6 g. valeramidine hydrochloride, and 15.3 g. 2-chlorophenyl isocyanate in 100 ml. dry acetone, there was obtained after recrystallization from isopropyl alcohol-ether 15.4 g. of the hydrochloride of 1-(2-chlorophenyl)-3-(pentanimidoyl)urea; M.P. 132–134° C.

EXAMPLE 6

1-(4-chloro-2-nitrophenyl)-3-(pentanimidoyl)urea (A) Following a procedure similar to that described in Example 1 but using 3.4 g. sodium in 300 ml. dry acetone, 20.2 g. valeramidine hydrochloride, and 29.3 g. 4-chloro-2-nitrophenyl isocyanate in 100 ml. dry acetone, there was obtained after recrystallization from absolute ethyl alcohol 21 g. of the hydrochloride of 1-(4-chloro-2-nitrophenyl)-3-(pentanimidoyl)urea; M.P. 170–174° C.

(B) The 4-chloro-2-nitrophenyl isocyanate used above was prepared as follows: A solution of 181 g. phosgene in 640 ml. chlorobenzene was chilled, 40 g. 4-chloro-2-nitroaniline was added portionwise with stirring, and the resulting mixture was slowly heated to reflux temperature in a phosgene atmosphere and heating was continued for three hours. The solution was evaporated to dryness under reduced pressure and the residue was recrystallized from hexane to give 4-chloro-2-nitrophenyl isocyanate; M.P. 54–56° C.

Following a procedure similar to that described in Example 6B but substituting for 4-chloro-2-nitroaniline an equivalent amount of the following:

(a) 4-hexyloxyaniline
(b) 5-(phenylpentyloxy)aniline
(c) 4-acetoxyaniline
(d) 4-acetamidoaniline
(e) 4-butyramidoaniline
(f) 3-methylsulfinylaniline
(g) 4-hexylsulfonylaniline
(h) 3-isobutylsulfonylaniline
(i) 3-hexylthioaniline There can be obtained respectively the following:

(a) 4-hexyloxyphenyl isocyanate
(b) (5-phenylpentyloxy)phenyl isocyanate
(c) 4-acetoxyphenyl isocpanate
(d) 4-acetamidophenyl isocyanate
(e) 4-butyramidophenyl isocyanate
(f) 3-methylsulfinylphenyl isocyanate
(g) 4-hexylsulfonylphenyl isocyanate
(h) 3-isobutylsulfonylphenyl isocyanate
(i) 3-hexylthiophenyl isocyanate Following a procedure similar to that described in Example 6A but substituting for 4-chloro-2-nitrophenyl isocyanate an equivalent amount of the following:

(a) 4-hexyloxyphenyl isocyanate
(b) 5-(phenylpentyloxy)phenyl isocyanate
(c) 4-acetoxyphenyl isocyanate
(d) 4-acetamidophenyl isocyanate
(e) 4-butyramidophenyl isocyanate
(f) 3-methylsulfinylphenyl isocyanate
(g) 4-hexylsulfonylphenyl isocyanate
(h) 3-isobutylsulfonylphenyl isocyanate
(i) 4-methylsulfonylphenyl isocyanate
(j) 3-hexylthiophenyl isocyanate
(k) 4-methylthiophenyl isocyanate
(l) 4-diethylaminophenyl isocyanate
(m) pentachlorophenyl isocyanate
(n) 2,4-diiodo-5-methoxyphenyl isocyanate
(o) 4-bromo-2-methylphenyl isocyanate There can be obtained respectively the hydrochlorides of the following:

(a) 1-(4-hexyloxyphenyl)-3-(pentanimidoyl)urea
(b) 1-[5-(phenylpentyloxy)phenyl]3-(pentanimidoyl)urea
(c) 1-(4-acetoxyphenyl)-3-(pentanimidoyl)urea
(d) 1-(4-acetamidophenyl)-3-(pentanimidoyl)urea
(e) 1-(4-butyramidophenyl-3-(pentanimidoyl)urea
(f) 1-(3-methylsulfinylphenyl)-3-(pentanimidoyl)urea
(g) 1-(4-hexylsulfonylphenyl)-3-(pentanimidoyl)urea
(h) 1-(3-isobutylsulfonylphenyl)-3-(pentanimidoyl)urea
(i) 1-(4-methylsulfonylphenyl)-3-(pentanimidoyl)urea
(j) 1-(3-hexylthiophenyl)-3-(pentanimidoyl)urea
(k) 1-(4-methylthiophenyl)-3-(pentanimidoyl)urea
(l) 1-(4-diethylaminophenyl)-3-(pentanimidoyl)urea
(m) 1-(pentachlorophenyl)-3-(pentanimidoyl)urea
(n) 1-(2,4-diiodo-5-methoxyphenyl)-3-(pentanimidoyl)urea
(o) 1-(4-bromo-2-methylphenyl)-3-(pentanimidoyl)urea.

EXAMPLE 7

1-(3,4-dichlorophenyl)-3-(pentanimidoyl)urea

Following a procedure similar to that described in Example 1 but using 3.39 g. sodium in 200 ml. dry acetone, 20 g valeramidine hydrochloride, and 27.6 g. 3,4-dichlorophenyl isocyanate in 100 ml. dry acetone, there was obtained after recrystallization from acetone 10.5 g. of the hydrochloride of 1-(3,4-dichlorophenyl)-3-(pentanimidoyl)urea; M.P. 177–179° C.

EXAMPLE 8

1-(4-chlorophenyl)-3-(hexanimidoyl)urea

Following a procedure similar to that described in Example 1 but using 3.2 g. of sodium in 200 ml. dry acetone, 21 g. hexanamidine hydrochloride, and 21.4 g. 4-chlorophenyl isocyanate in 100 ml. dry acetone, there was obtained after recrystallization from acetone 13.9 g. of the hydrochloride of 1-(4-chlorophenyl)-3-(hexanimidoyl)urea; M.P. 175–179° C.

EXAMPLE 9

1-(4-nitrophenyl)-3-(pentanimidoyl)urea

Following a procedure similar to that described in Example 1 but using 3.39 g. sodium in 200 ml. dry acetone, 20 g. valeramidine hydrochloride, and 21.9 g. 4-nitrophenyl isocyanate in 100 ml. dry acetone, there was obtained after recrystallization from methyl alcohol 10.8 g. of the hydrochloride of 1-(4-nitrophenyl)-3-(pentanimidoyl)urea; M.P. 187–191° C.

EXAMPLE 10

1-(4-aminophenyl)-3-(pentanimidoyl)urea

A solution of 30 g. of 1-(4-nitrophenyl-3-(pentanimidoyl)urea hydrochloride (see Example 9) in 300 ml. ice-cold water was treated with 8 g. sodium hydroxide in 40 ml. water. The mixture was extracted with ether and the ethereal solution was dried over calcium sulfate and evaporated to dryness. The residue was taken up in 400 ml. absolute alcohol and hydrogenated over Raney nickel at 392 pounds pressure and at room temperature until the hydrogen uptake was complete. The catalyst was removed by filtration and the solvent was removed under reduced pressure at 50° C. to give after recrystallization succesively from ether and benzene 13.5 g. of 1-(4-aminophenyl)-3-(pentanimidoyl)urea; M.P. 102–103° C.

EXAMPLE 11

1-(4-chlorophenyl)-3-(N-methylpentanimidoyl)urea (A) Following a procedure similar to that described in Example 1 but using 5.25 g. sodium in 200 ml. dry acetone, 37.8 g. N-methylvaleramidine hydrochloride, and 38.4 g. p-chlorophenyl isocyanate in 100 ml. dry acetone, there was obtained after recrystallization from ethyl alcohol 15.0 g. of the hydrochloride of 1-(4-chlorophenyl)-3-(N-methylpentanimidoyl)urea; M.P. 154–158° C.

(B) The N-methylvaleramidine hydrochloride used above was prepared as follows: 20.8 g. valeronitrile in 8 g. dry methyl alcohol and 12 ml. absolute ether was treated, with ice-bath cooling, with hydrogen chloride gas until 9.1 g. had been absorbed and left to stand at 5° C. for sixty hours. The resulting solid imino-methylether was collected and added to 7.8 g methylamine in 50 ml. absolute ethyl alcohol and the solution was stirred at room temperature for twenty hours, filtered, and the filtrate was evaporated to dryness. The residue was slurried in ether and the ether was decanted. The resulting N-methylvaleramidine was used without further purification in the next step.

Following a procedure similar to that described in Example 11–B but substituting for methylamine an equivalent amount of the following:

(a) isopropylamine
(b) hexylamine

There can be obtained respectively the hydrochlorides of the following:

(a) N-isopropylvaleramidine
(b) N-hexylvaleramidine

Following a procedure similar to that described in Example 11–A but substituting for N-methylvaleramidine an equivalent amount of the hydrochlorides of:

(a) N-isopropylvaleramidine
(b) N-hexylvaleramidine

There can be obtained respectively the hydrochlorides of the following:

(a) 1-(4-chlorophenyl)-3-(N-isopropylpentanimidoyl)urea
(b) 1-(4-chlorophenyl)-3-(N-hexylpentanimidoyl)urea

EXAMPLE 12

1-(3-chlorophenyl)-3-(pentanimidoyl)urea

Following a procedure similar to that described in Example 1 but using 3.9 g. sodium in 300 ml. dry acetone, 41.1 g. valeramidine hydrochloride, and 46.2 g. 3-chlorophenyl isocyanate in 200 ml. dry acetone, there was obtained after recrystallization from acetone 27.1 g. of the hydrochloride of 1-(3-chlorophenyl)-3-(pentanimidoyl)urea; M.P. 135–137° C.

EXAMPLE 13

1-(4-chlorophenyl)-3-(butanimidoyl)urea

Following a procedure similar to that described in Example 1 but using 2.5 g. sodium in 150 ml. dry acetone, 14 g. butyramidine hydrochloride, and 16.8 g. 4-chlorophenyl isocyanate in 70 ml. dry acetone, there was obtained after recrystallization from ethyl alcohol 20.6 g. of the hydrochloride of 1-(4-chlorophenyl)-3-(butanimidoyl)urea; M.P. 206–208° C.

EXAMPLE 14

1-(4-chlorophenyl)-3-(heptanimidoyl)urea

Following a procedure similar to that described in Example 1 but using 3.9 g. sodium in 300 ml. dry acetone, 24.6 g. heptanamidine hydrochloride, and 23 g. 4-chlorophenyl isocyanate in 100 ml. dry acetone, there was obtained after recrystallization from acetonitrile 29.8 g. of the hydrochloride of 1-(4-chlorophenyl)-3-(heptanimidoyl)urea; M.P. 168–169° C.

EXAMPLE 15

1-(3-nitrophenyl)-3-(pentanimidoyl)urea

Following a procedure similar to that described in Example 1 but using 2.3 g. sodium in 150 ml. dry acetone, 13.6 g. valeramidine hydrochloride, and 16.4 g. 3-nitrophenyl isocyanate in 300 ml. benzene, there was obtained after recrystallization from ethyl alcohol-ether 11.6 g. of the hydrochloride of 1-(3-nitrophenyl)-3-(pentanimidoyl)urea; M.P. 161–163° C.

EXAMPLE 16

1-(2-nitrophenyl)-3-(pentanimidoyl)urea

Following a procedure similar to that described in Example 1 but using 2.3 g. sodium in 150 ml. dry acetone, 13.6 g. valeramidine hydrochloride, and 16.4 g. 2-nitrophenyl isocyanate in 300 ml. benzene, there was obtained after recrystallization from ethyl alcohol 9.1 g. of the hydrochloride of 1-(2-nitrophenyl)-3-(pentanimidoyl)urea; M.P. 130–132° C.

EXAMPLE 17

1-[3-(trifluoromethyl)phenyl]-3-(pentanimidoyl)urea

Following a procedure similar to that described in Example 1 but using 2.3 g. sodium in 250 ml. dry acetone, 13.6 g. valeramidine hydrochloride, and 18.7 g. 3-(trifluoromethyl)phenyl isocyanate in 100 ml. dry acetone, there was obtained after recrystallization from acetonitrile 17.9 g. of the hydrochloride of 1-[3-(trifluoromethyl)phenyl]-3-(pentanimidoyl)urea; M.P. 167–169° C.

EXAMPLE 18

1-[2-(benzyloxy)phenyl]-3-(pentanimidoyl)urea

Following a procedure similar to that described in Example 1 but using 2.9 g. sodium in 300 ml. dry acetone, 17.7 g. valeramidine hydrochloride, and 29.3 g. 2-(benzyloxy)phenyl isocyanate in 200 ml. dry acetone, there was obtained after recrystallization from isopropyl alcohol 33.9 g. of the hydrochloride of 1-[2-(benzyloxy)phenyl]-3-(pentanimidoyl)urea; M.P. 145–147° C.

EXAMPLE 19

1-(2-hydroxyphenyl)-3-(pentanimidoyl)urea

A suspension of 9.65 g. of the hydrochloride of 1-[2-(benzyloxy)phenyl]-3-(pentanimidoyl)urea (see Example 18) in 20 ml. ice-cold water was treated with 5 ml. concentrated ammonium hydroxide solution, extracted with ether and the ethereal solution was dried over calcium sulfate and evaporated to dryness under reduced pressure. A solution of the residual free base in 80 ml. absolute ethyl alcohol was hydrogenated over 1.2 g. palladium-charcoal at 82 pounds pressure at room temperature. When the required uptake of hydrogen was completed, the mixture was filtered and the filtrate was evaporated to dryness under reduced pressure. A solution of the residue in ether was chilled and treated with ethereal hydrogen chloride until acidic. The resulting solid was collected by filtration and recrystallized from ethyl alcohol-ether to give 4.5 g. of the hydrochloride of 1-(2-hydroxyphenyl)-3-(pentanimidoyl)urea; M.P. 173–175° C.

EXAMPLE 20

1-(4-bromophenyl)-3-(pentanimidoyl)urea

Following a procedure similar to that described in Example 1 but using 2.3 g. sodium in 300 ml. dry acetone, 13.6 g. valeramidine hydrochloride, and 19.8 g. 4-bromophenyl isocyanate, there was obtained after recrystallization from ethyl alcohol 21 g. of the hydrochloride of 1-(4-bromophenyl)-3-(pentanimidoyl)urea; M.P. 210–212° C.

EXAMPLE 21

1-(4-fluorophenyl)-3-(pentanimidoyl)urea

Following a procedure similar to that described in Example 1 but using 8.4 g. sodium in 600 ml. dry acetone, 49.6 g. valeramidine hydrochloride, and 50 g. 4-fluorophenyl isocyanate in 150 ml. dry acetone, there was obtained after recrystallization from isopropyl alcohol 61.3 g. of the hydrochloride of 1-(4-fluorophenyl)-3-(pentanimidoyl)urea; M.P. 167–172° C.

EXAMPLE 22

1-(4-chlorophenyl)-3-(propanimidoyl)urea

To a stirred, cooled mixture of 10.8 g. sodium methoxide in 100 ml. dry benzene was added 21.6 g. propionamidine hydrochloride in one portion and stirring was continued for twenty minutes. To this mixture at room temperature was added a solution of 30.6 g. of 4-chlorophenyl isocyanate in 100 ml. benzene dropwise during fifteen minutes and stirring was continued for eighteen hours. The mixture was filtered and the filterate was evaporated to dryness under reduced pressure. A solution of the resulting residue in ether was chilled and treated with ethereal hydrogen chloride until acidic. The solid was collected by filtration to give after recrystallization from acetonitrile 22 g. of the hydrochloride of 1-(4-chlorophenyl)-3-(propanimidoyl)urea; M.P. 191–192° C.

EXAMPLE 23

1-phenyl-3-(heptanimidoyl)urea

To a stirred mixture, prepared by reacting 4.5 g. sodium with 350 ml. dry acetone at room temperature, was added 32.8 g. heptanamidine hydrochloride in one portion and stirring was continued for twenty minutes. To the resulting mixture was added dropwise, during one and one-half hours, a solution of 23.8 g. phenyl isocyanate in 100 ml. dry acetone with stirring and external cooling in order to prevent the exothermic reaction from heating the mixture above room temperature. Stirring was continued at room temperature for eighteen hours and the mixture was concentrated to dryness under reduced pressure. The residue was taken up in ether and the sodium chloride was removed by filtration. The filtrate was chilled and treated with ethereal hydrogen chloride until acidic and the resulting solid was collected by filtration, washed with ether, and recrystallized from acetonitrile to give 25.3 g. 1-phenyl-3-(heptanimidoyl)urea hydrochloride; M.P. 151–152° C.

Following a procedure similar to that described in Example 23 but substituting for heptanamidine hydrochloride an equivalent amount of the hydrochloride of the following:

(a) N-methylvaleramidine
(b) N-isopropylvaleramidine
(c) N-hexylvaleramidine

There can be obtained respectively the hydrochlorides of the following:

(a) 1-(phenyl)-3-(N-methylheptanimidoyl)urea
(b) 1-(phenyl)-3-(N-isopropylheptanimidoyl)urea
(c) 1-(phenyl)-3-(N-hexylheptanimidoyl)urea.

Following a procedure similar to that described in Example 23 but substituting for heptanamidine hydrochloride an equivalent amount of the hydrochlorides of the following:

(a) acetamidine
(b) isobutyramidine
(c) 3,7-dimethyloctanamidine
(d) tridecanamidine
(e) pentadecanamidine There can be obtained respectively the hydrochlorides of the following:

(a) 1-phenyl-3-(acetimidoyl)urea
(b) 1-phenyl-3-(isobutyrimidoyl)urea
(c) 1-phenyl-3-(3,7-dimethyloctanimidoyl)urea
(d) 1-phenyl-3-(tridecanimidoyl)urea
(e) 1-phenyl-3-(pentadecanimidoyl)urea.

EXAMPLE 24

1-phenyl-3-(pentanimidoyl)urea

Following a procedure similar to that described in Example 23 but using 6.9 g. sodium in 300 ml. dry acetone, 41.1 g. valeramidine hydrochloride, and 35.7 g. phenyl isocyanate in 200 ml. dry acetone, there was obtained after recrystallization from ethyl alcohol 40.3 g. 1-phenyl-3-(pentanimidoyl)urea hydrochloride; M.P. 155.5–156° C.

EXAMPLE 25

1-(4-tolyl)-3-(pentanimidoyl)urea

Following a procedure similar to that described in Example 23 but using 2.3 g. sodium in 300 ml. dry acetone, 13.6 g. valeramidine hydrochloride and 13.3 g. 4-tolyl isocyanate in 100 ml. dry acetone, there was obtained after recrystallization from acetonitrile 10.6 g. 1-(4-tolyl)-3-(pentanimidoyl)urea hydrochloride; M.P. 159–160° C.

Following the general procedure described hereinbefore for the preparation of phenyl isocyanates from the corresponding phenylamines and exemplified in Example 6B there can be obtained respectively from the following amines:

(a) 4-hexylaniline
(b) 2,3,4,5-tetramethylaniline
(c) 2-ethyl-6-isopropylaniline
(d) 4-tert-pentylaniline The following isocyanates:

(a) 4-hexylphenyl isocyanate
(b) 2,3,4,5-tetramethylphenyl isocyanate
(c) 2-ethyl-6-isopropylphenyl isocyanate
(d) 4-tert-pentylphenyl isocyanate.

Following a procedure similar to that described in Example 23 but substituting for phenyl isocyanate an equivalent amount of the phenyl isocyanates listed from (a) to (d) inclusive above, there can be obtained respectively the hydrochlorides of the following:

(a) 1-(4-hexylphenyl)-3-(heptanimidoyl)urea
(b) 1-(2,3,4,5-tetramethylphenyl)-3-(heptanimidoyl)urea
(c) 1-(2-ethyl-6-isopropylphenyl)-3-(heptanimidoyl)urea
(d) 1-(4-tert-pentylphenyl)-3-(heptanimidoyl)urea The compounds listed below, in addition to their anti-hookworm activity, were also found to have anti-tapeworm activity against *Taenia pisiformis* and *Dipylidium caninum* when administered to such tapeworm-infected dogs in the dose range of from 85 to 90 mg./kg. once daily for three consecutive days:

1-(4-chlorophenyl)-3-(pentanimidoyl)urea (Example 1)
1-(2-chlorophenyl)-3-(pentanimidoyl)urea (Example 5)
1-(4-chlorophenyl)-3-(hexanimidoyl)urea (Example 8)
1-(2-nitrophenyl)-3-(pentanimidoyl)urea (Example 16)
1-[3-(trifluoromethyl)phenyl]-3-(pentanimidoyl)urea Example 17)
1-[2-(benzyloxy)phenyl]-3-(pentanimidoyl)urea (Example 18)
1-(4-bromophenyl)-3-(pentanimidoyl)urea (Example 20).

I claim:
1. The method of eliminating hookworms and tapeworms from warm blooded animals infested by such helminths which comprises orally administering to the host an anthelmintically effective amount of a compound of the formula

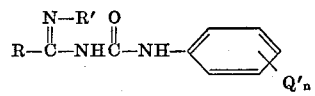

where
R is alkyl of 1–14 carbons;
R' is hydrogen or lower-alkyl of 1–6 carbons;
Q' is from 0 to $n$ substituents of the group consisting of lower-alkyl, lower-alkoxy, phenyl-lower-alkoxy, lower-alkanoyloxy, hydroxy, di(lower-alkyl)amino, lower-alkanoylamino, amino, lower-alkylsulfonyl, lower-alkylsulfinyl, lower-alkylthio, trihalomethyl, nitro and halo, wherein the terms lower-alkyl, lower-alkoxy and lower-alkanoyl each mean a group consisting of 1–5 carbons;

and $n$ is an integer from 0 to 5.

2. The method according to claim 1 wherein the compound administered is selected from the group consisting of 1-(4-tolyl)-3-(pentanimidodyl)urea, 1 - phenyl-3-(pentanimidoyl)urea and 1-phenyl-3-(heptanimidoyl)urea.

3. A composition, for eliminating hookworms and tapeworms from warm blooded animals, comprising as the essential active ingredient in anthelmintically effective amount a compound of the formula

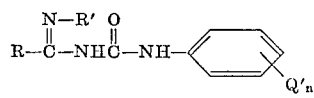

where
R is alkyl of 1–14 carbons;
R' is hydrogen or lower-alkyl of 1–6 carbons;
Q' is from 0 to $n$ substituents of the group consisting of lower-alkyl, lower-alkoxy, phenyl-lower-alkoxy, lower-alkanolyoxy, hydroxy, di(lower-alkyl)amino, lower-alkanoylamino, amino, lower-alkylsulfonyl, lower-alkylsulfinyl, lower-alkylthio, trihalomethyl, nitro and halo, wherein the terms lower-alkyl, lower-alkoxy and lower-alkanoyl each mean a group consisting of 1–6 carbons;

and $n$ is an integer from 0 to 5;

in conjunction with an enterally acceptable pharmaceutical excipient.

4. A composition according to claim 3 in unit dosage form.

5. A composition according to claim 3 wherein the essential active ingredient is a compound chosen from the group consisting of 1-(4-tolyl)-3-(pentanimidoyl)-urea, 1 - phenyl-3-(pentanimidoyl)urea and 1-phenyl-3-(heptanimidoyl)urea.

6. A composition according to claim 5 in unit dosage form.

References Cited

UNITED STATES PATENTS 3,146,262  8/1964  Schafer et al. _____ 260—553

FOREIGN PATENTS 1,175,223  8/1964  Germany _____ 260—553 A
1,045,170  10/1966  Great Britain ____ 260—553 A ALBERT T. MEYERS, Primary Examiner
F. E. WADDELL, Assistant Examiner U.S. Cl. X.R.

260—553

UNITED STATES PATENT OFFICE
CERTIFICATE OF CORRECTION

Patent No. 3,629,455 (SN 711,235)   Dated December 21, 1971

Inventor(s)  Guy D. Diana

It is certified that error appears in the above-identified patent and that said Letters Patent are hereby corrected as shown below:

Column 4, line 36, "II and IX" should read --II (and IX--.

Column 5, lines 23 and 24, "froms" should read --forms--; line 42, "I and XVI" should read --XI and XVI--.

Column 6, line 28, "posses" should read --possess--.

Column 7, lines 12 and 13, "in conjunction with an integer from 0 to 5, in conjunction with an enterally" should read --in conjunction with an enterally--.

Column 8, line 8, "drynes" should read --dryness--.

Column 9, line 50, "isocpanate" should read --isocyanate--.

Column 10, line 8, "1-(4-butyramidophenyl-" should read --1-(4-butyramidophenyl)---; line 56, "1-(4-nitrophenyl-" should read --1-(4-nitrophenyl)---; line 68, "succesively" should read --successively--.

Column 11, line 44, "3.9 g." should read --6.9 g.--.

Column 13, line 45, "hydrochloride" should read --hydrochlorides--.

Column 15, line 11, "(pentanimidodyl)" should read --(pentanimidoyl)--.

Signed and sealed this 18th day of July 1972.

(SEAL)
Attest:

EDWARD M. FLETCHER, JR.
Attesting Officer

ROBERT GOTTSCHALK
Commissioner of Patents